(12) United States Patent
Kraft et al.

(10) Patent No.: US 8,528,674 B2
(45) Date of Patent: Sep. 10, 2013

(54) VACUUM GENERATION IN HYBRID-DRIVE VEHICLES

(75) Inventors: Dieter Kraft, Gerlingen (DE); Michael Bildstein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 778 days.

(21) Appl. No.: 12/305,805

(22) PCT Filed: Jun. 11, 2007

(86) PCT No.: PCT/EP2007/055698
§ 371 (c)(1),
(2), (4) Date: May 13, 2010

(87) PCT Pub. No.: WO2008/015048
PCT Pub. Date: Feb. 7, 2008

(65) Prior Publication Data
US 2010/0230187 A1    Sep. 16, 2010

(30) Foreign Application Priority Data
Aug. 4, 2006  (DE) .......................... 10 2006 036 445

(51) Int. Cl.
*B60T 17/02* (2006.01)
*B60K 25/00* (2006.01)
*B60K 6/26* (2007.10)
*B60K 6/387* (2007.10)
*B60W 10/02* (2006.01)
*B60W 10/30* (2006.01)
*B60W 20/00* (2006.01)

(52) U.S. Cl.
USPC .................... 180/53.8; 180/65.275; 903/946; 903/947

(58) Field of Classification Search
USPC ........ 180/58.3, 65.245, 65.25, 65.27, 65.275; 903/946, 947
See application file for complete search history.

(56) References Cited

U.S. PATENT DOCUMENTS

| | | | | |
|---|---|---|---|---|
| 2,095,833 | A | * | 10/1937 | Rockwell .................... 180/53.8 |
| 5,635,805 | A | * | 6/1997 | Ibaraki et al. ................. 318/139 |
| 5,961,189 | A |   | 10/1999 | Lutteke et al. |
| 6,668,953 | B1 |  | 12/2003 | Reik et al. |
| 2002/0103055 | A1 | * | 8/2002 | Tani et al. .................... 477/115 |
| 2003/0094317 | A1 |  | 5/2003 | Takizawa et al. |
| 2003/0102173 | A1 |  | 6/2003 | Koelle et al. |
| 2004/0118367 | A1 | * | 6/2004 | Ezaki et al. ................ 123/90.11 |

FOREIGN PATENT DOCUMENTS

| | | |
|---|---|---|
| DE | 199 29 880 | 1/2001 |
| DE | 100 36 504 | 2/2001 |
| EP | 1 173 674 | 1/2002 |

(Continued)

OTHER PUBLICATIONS

International Search Report, PCT/EP2007/055698, dated Sep. 5, 2007.

*Primary Examiner* — J. Allen Shriver, II
*Assistant Examiner* — Bridget Avery
(74) *Attorney, Agent, or Firm* — Kenyon & Kenyon LLP

(57) ABSTRACT

A device and a method for generating a vacuum in a brake system of a vehicle equipped with a hybrid drive. The hybrid drive includes an internal combustion engine and at least one electric drive, which is selectively uncoupled from the internal combustion engine with the aid of a clutch. A vacuum pump having an adjustable pumping capacity is mechanically connected to the at least one electric drive.

17 Claims, 2 Drawing Sheets

(56) References Cited

FOREIGN PATENT DOCUMENTS

| EP | 1 314 884 | 5/2003 |
| FR | 2 877 629 | 5/2006 |
| GB | 2 383 313 | 6/2003 |
| JP | 56-4962 | 6/1954 |
| JP | 8-80836 | 3/1996 |
| JP | 2003-22843 | 1/2003 |
| JP | 2003-231420 | 8/2003 |
| JP | 2005-330844 | 12/2005 |

* cited by examiner

VACUUM GENERATION IN HYBRID-DRIVE VEHICLES

BACKGROUND INFORMATION

Published European patent document EP 1 173 674 describes a drive train of a motor vehicle. The drive train includes an internal combustion engine, which is associated with an electric machine which generates a torque when the internal combustion engine is started. A clutch, via which a torque generated by the internal combustion engine is transmitted to at least one drive wheel of the vehicle, is provided between the internal combustion engine and a transmission. Devices are provided which, when the internal combustion engine is started, operate the clutch in such a way that a first portion of the torque generated by the electric machine when the internal combustion engine is started is transmitted to the at least one drive wheel of the vehicle and a second portion of the torque generated by the electric machine, which is sufficient for starting the internal combustion engine, is transmitted to the internal combustion engine. The clutch is operated with the aid of a control device, taking into account temperature and/or rotational speed-dependent characteristics maps for the drive torque of the internal combustion engine and/or for the start torque and/or for the clutch torque which is predominantly a function of the clutch engagement path.

In other vehicle drives in use such as hybrid drives having at least one internal combustion engine and at least one additional electric drive, the motor vehicle may be moved only with the aid of the at least one electric drive, depending on the design of the drive train. In this case, the at least one electric drive delivers the entire drive power, whereas the internal combustion engine remains switched off. In the "electric drive" operating mode the internal combustion engine at rest may be started by the at least one electric drive. This may take place, for example, with the aid of a pulse start, the angular momentum of the at least one rotating electric drive being used to set the internal combustion engine at rest into rotation. In order to perform the pulse start, first the rotational speed of the at least one electric drive is increased. In order not to cause the rotational speed of the at least one electric drive to increase suddenly, a clutch situated between the at least one electric drive and a vehicle transmission is usually operated by torque regulation and, during this operating phase of the motor vehicle equipped with a hybrid drive, transmits the driver input torque. After the rotational speed of the at least one electric drive has been increased, a clutch situated between the at least one electric drive and the internal combustion engine is engaged. The disadvantage of this procedure is that the clutch between the vehicle transmission and the at least one electric drive operated in a slip state cannot be operated for a longer period in the slip state which, on the one hand, is necessary for maintaining a continuous output speed; however, on the other hand, it would result in a mechanical or thermal overload on the clutch. This precludes operating the clutch between the at least one electric drive and the transmission of the vehicle equipped with a hybrid drive for a longer time period. To perform the above-mentioned pulse start, the rotational speed at the at least one electric drive of the hybrid drive must first be increased so that the overall start process is extended, since the at least one electric drive must be accelerated first. Only thereafter may a drive connection to the internal combustion engine be established and, at the same time, complex torque regulation of the clutch of the at least one electric drive to the vehicle transmission may take place in order not to generate any sudden torque changes at the output.

In certain types of vehicle drives, such as vehicles having compression-ignition engines, no high vacuum is formed in the intake manifold during operation. This is true for the above-mentioned compression-ignition engines, but also for internal combustion engines that are equipped with direct gasoline injection. In these vehicle types, a vacuum-driven power-assisted braking may be adequately supplied with the aid of a vacuum pump additionally flanged to the internal combustion engine. This vacuum pump directly coupled to the internal combustion engine is continuously driven at a rotational speed that is a function of the engine speed, which, however, as a rule, represents a drive ill-adapted to operating requirements.

SUMMARY

An approach provided according to the present invention is based on the object of reliably operating a vacuum-operated brake system in the case of a pure electric driving operation of a vehicle equipped with a hybrid drive.

According to the approach provided according to the present invention, a vacuum pump providing a vacuum is regulated according to operating requirements and ensures that, in the case of long distances driven without braking, no unnecessary energy losses occur, yet a vacuum supply is ensured even in the pure electric driving operation of a vehicle having a hybrid drive.

It is provided according to the present invention to use a vacuum pump which, due to its design characteristics, provides for a variable volume flow. This is the case, for example, with a vacuum pump designed as an adjustable axial piston pump. A vacuum pump of this type is controlled by the differential pressure between a vacuum accumulator, for example, a vacuum-controlled brake booster of a vehicular brake system, and an ambient pressure. If the differential pressure between the ambient pressure and the vacuum prevailing in the vacuum accumulator is sufficiently high, the boost of the vacuum pump is suspended so that the desired brake boosting may be ensured. In the case of a hybrid drive train having a clutch, the vacuum pump may be directly flanged to the internal combustion engine. If the hybrid drive is a parallel hybrid having two clutches, for example an A clutch and a B clutch, the vacuum pump may no longer be operated from the internal combustion engine. According to the approach provided according to the present invention, the vacuum pump is driven by the at least one electric machine of the hybrid drive, which in purely electric driving operation, unlike the internal combustion engine, may also output mechanical power to auxiliary devices, which the internal combustion engine is unable to do in purely electric driving operation, since it is turned off according to the operating strategy of a hybrid drive.

Using the approach provided according to the present invention, a vacuum supply for brake boosting may thus be ensured, while this cannot be ensured by the internal combustion engine in the case of a hybrid drive in which purely electric driving operation is possible, since the internal combustion engine is turned off. At the same time, the control strategy of the vacuum pump ensures that no vacuum pump operation that permanently consumes mechanical power occurs if this is not necessary. This is true regarding brake boosting in operating phases that are unfavorable in purely electric driving operation, for example, during longer driving at a very low speed. In this case, a basic vacuum supply of the brake booster system is ensured. If needed, the vacuum supply for brake boosting may be provided by an additional electrically operated vacuum pump which may be designed for a lower volume flow and a shorter service life than a single vacuum pump.

DETAILED DESCRIPTION OF EXAMPLE EMBODIMENTS

Figure 1:
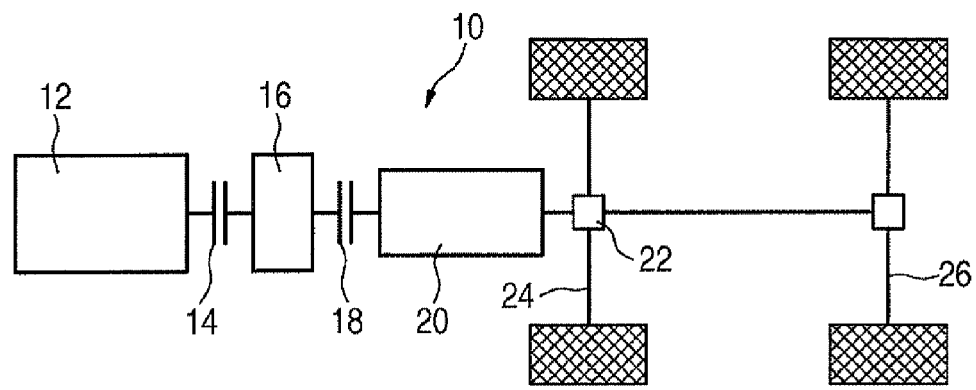
FIG. 1 shows a hybrid drive train having an A clutch between an internal combustion engine and at least one electric drive, and a B clutch between the at least one electric drive and a vehicle transmission.

FIG. 1 shows a hybrid drive train which has an A clutch between an internal combustion engine and at least one electric drive, and a B clutch between at the least one electric drive and a vehicle transmission.

The following exemplary embodiments refer to a parallel hybrid (P2) drive train, which is characterized by an A clutch 14 between an internal combustion engine 12 and at least one electric machine, e.g., an electric drive 16, and a further B clutch 18 between the at least one electric drive 16 and a vehicle transmission 20. The example embodiment of the hybrid drive as a P2 or as a power-branching hybrid drive is of secondary importance in the present context. The configuration of a hybrid drive according to FIG. 1 is referred to as a P2 hybrid and is labeled in FIG. 1 by reference numeral 10. Axle transmission 22, which is acted upon by an output shaft of vehicle transmission 20, is situated downstream from vehicle transmission 20. Drive wheels of individual, multiple, or all axles, for example, of a front axle 24, may be driven via axle transmission 22. Another output shaft connects axle transmission 22 of front axle 24 to a rear axle 26, whose wheels may also be driven, which, however, has no further relevance for the present invention.

Figure 2:
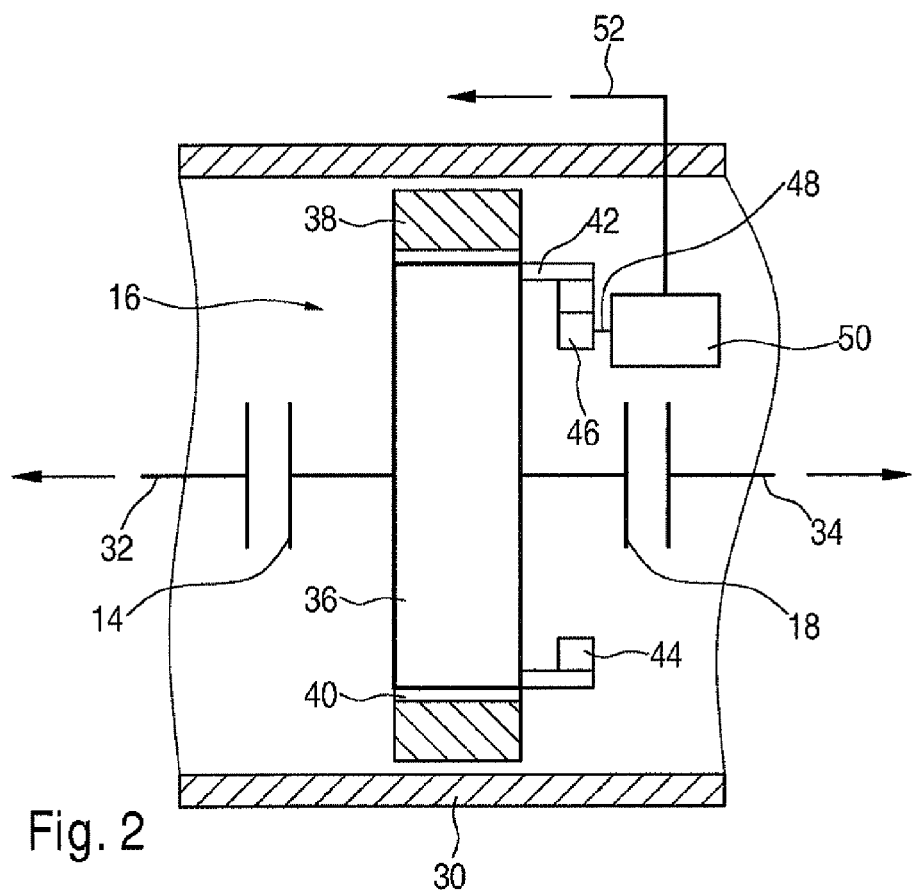
FIG. 2 schematically shows an example of an installation position of a vacuum pump.

FIG. 2 schematically shows an example of an installation of a vacuum pump into a vehicle transmission.

From FIG. 2 it is apparent that A clutch 14 and B clutch 18 may be installed in one transmission housing 30. Clutches 14, 18 and a vacuum pump 50 used according to the present invention may, however, also be situated outside transmission housing 30. A shaft extends from A clutch 14 to internal combustion engine 12 (not shown in FIG. 2). A transmission output 34 extends from B clutch 18 to vehicle transmission 20 of hybrid drive 10. Transmission housing 30 encloses the at least one electric drive 16, which has a rotor 36, enclosed by a stator 38. An air gap 40 is formed between the outer periphery of rotor 36 and the inner periphery of stator 38 enclosed by transmission housing 30. In the embodiment depicted in FIG. 2, there is an internal gear 42 on rotor 36, which is installed in transmission housing 30 coaxially with A clutch 14 and coaxially with B clutch 18. In one embodiment, a toothed gear 44, which meshes with a pinion 46, may be formed on internal gear 42. In FIG. 2, pinion 46 is installed on a pump shaft 48, which drives a vacuum pump 50. Vacuum pump 50 is in turn connected to a brake system, in particular to a vacuum-controlled brake booster, via a vacuum line 52.

Figure 3:
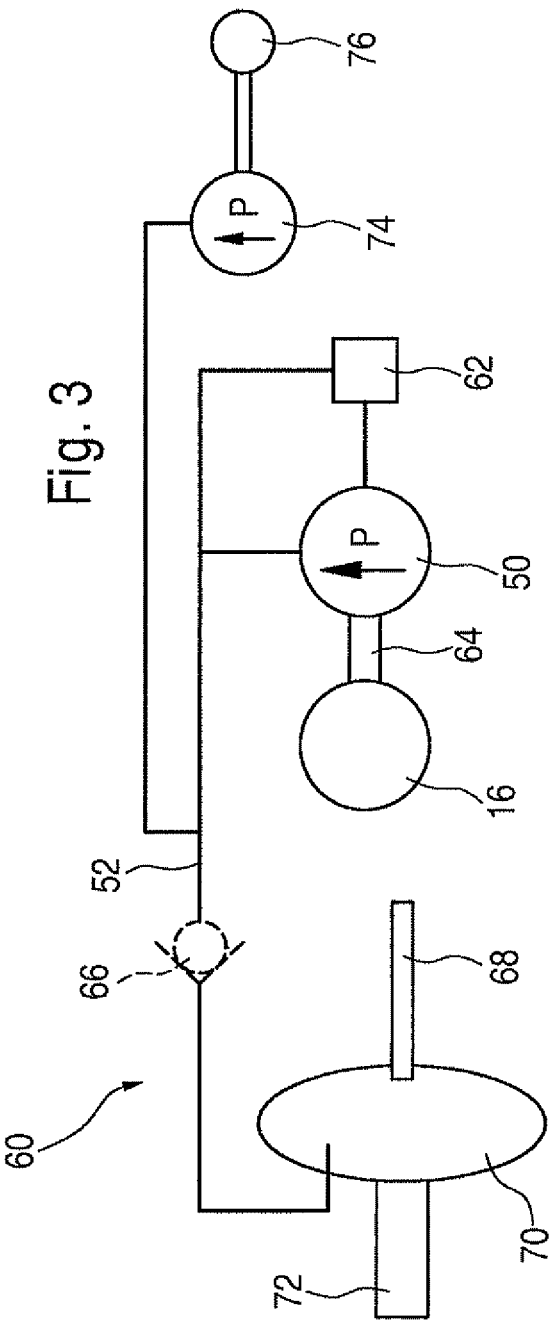
FIG. 3 shows a circuit diagram of a vacuum supply of a brake booster system via a vacuum pump driven by at least one electric machine.

The vacuum pump 50 schematically indicated in FIG. 2 is a vacuum pump which, due to its design characteristics, allows for a variable volume flow, thus, for example, an adjustable axial piston pump. The variable volume flow of vacuum pump 50 is controlled by a differential pressure between a vacuum booster and the ambient pressure. FIG. 3 shows the at least one electric drive 16 in the P2 hybrid drive train 10, in which the at least one electric drive 16 may rotate freely by appropriately disengaging A clutch 14 and B clutch 18. According to the embodiment depicted in FIG. 2, vacuum pump 50 may be either flanged to the at least one electric drive 16 or, if adequate space and layout of the at least one electric drive 16 are available, integrated into the latter, so that there is a mechanical link between pump shaft 48 and rotor 36 of the at least one electric drive 16. In FIG. 2, the mechanical link between rotor 36 and the at least one electric drive 16 is established by the internal gear 42 installed on rotor 36. The toothed gear 44, which has an internal toothing which meshes with the pinion 46 installed on pump shaft 48, is situated on the internal periphery of internal gear 42. Instead of the mechanical link between vacuum pump 50 and the at least one electric drive 16 schematically shown in FIG. 2, a spur gear or an angle drive may also be used as an alternative to internal gear 42.

A vacuum line identified by reference numeral 52 runs from vacuum pump 50 (which is designable as an adjustable axial or radial piston pump, as a vane-cell pump having an adjustable eccentricity between pump shaft 48 and the housing, or as an adjustable axial piston pump) to the brake system.

Vacuum line 52 runs between a vacuum accumulator (depicted in FIG. 3) and a suction side of vacuum pump 50. The exhaust air of the pump may be discharged into the atmosphere at a suitable site directly or via the engine housing of internal combustion engine 12. Vacuum pump 50 rotating as a function of the at least one electric drive 16 now pumps air from the vacuum accumulator (see FIG. 3) into the environment only if the vacuum drops in the vacuum accumulator. For this purpose, vacuum pump 50 may be controlled via a vacuum actuator, for example, which is pneumatically controlled by the vacuum applied in vacuum line 52. Alternatively, electronic control with the aid of an actuator is also conceivable, which regulates a pumping capacity, i.e., the volume flow of vacuum pump 50.

When an adjustable axial piston pump is used, to cite an example, the pumping capacity is adjusted, i.e., the volume flow pumped by vacuum pump 50 is modified by adjusting the maximum piston stroke during one revolution.

Instead of the mechanical link depicted in FIG. 2 between vacuum pump 50 and rotor 36 of the at least one electric drive 16 via internal gear 42, toothed gear 44 attached to internal gear 42, and pinion 46 formed on pump shaft 48, vacuum pump 50 may also be driven via an angle drive or via a spur gear or the like, depending on the available installation spaces. Any other drive link, such as a belt drive or a toothed belt drive, for example, may also be used.

FIG. 3 shows a pneumatic circuit of a device provided according to the present invention for generating a vacuum.

From FIG. 3 it is apparent that the at least one electric drive 16 is coupled to vacuum pump 50 via a rigid shaft 64.

Vacuum pump 50 is in turn activated with the aid of a vacuum-operated actuator 62, which may be designed as a vacuum actuator, for example. Vacuum pump 50 pumps into vacuum line 52, which, in the simplest case, is designed as a hose. Vacuum line 52 extends from vacuum pump 50 to a vacuum accumulator 70.

Vacuum accumulator 70 acts upon a main brake cylinder 72 and is in turn connected to a pedal rod 68 operable via a brake pedal. A check valve 66 may be optionally integrated into vacuum line 52 extending between vacuum accumulator 70 and vacuum-operated actuator 62. An excessively rapid pressure surge in vacuum accumulator 70 in the event of a leak in vacuum line 52 is prevented by this optional check valve 66, which is situated upstream from vacuum accumulator 70. Check valve 66 does not modify the function of the volume flow control. Vacuum accumulator 70 may be provided with a continuous monitoring device which monitors the vacuum prevailing in vacuum accumulator 70 and thus generates an error message in the event of a gradual pressure increase.

Vacuum line 52 between pressure-controlled actuator 62 and vacuum accumulator 70 may, in the simplest case, be designed as a hose connection between vacuum pump 50 and vacuum accumulator 70. If valves are integrated into a vacuum line 52 designed as a hose connection, the latter is suitable both as a supply line from vacuum pump 50 to vacuum accumulator 70 and as a control line for transmitting the vacuum prevailing in vacuum accumulator 70 to pressure-controlled actuator 62. In the case where a check valve 66 is installed in vacuum line 52, actuator 62 may be pneumatically controlled via an independent control line. Alternatively, a check valve 66 may be used, where a defined return flow rate in the closing direction may be implemented, and which allows control, but only allows a sufficiently slow return flow into a vacuum accumulator 70.

The vacuum pump 50 depicted in FIGS. 2 and 3 is designed in particular as a variable-capacity vacuum pump. For this purpose, it may be configured as an adjustable axial piston pump, to cite an example, which is controlled by a differential pressure between vacuum accumulator 70 and the environment. If the differential pressure between the ambient pressure and the inside of vacuum accumulator 70 is sufficiently high for ensuring the desired braking boost within a brake system of a motor vehicle, the capacity of vacuum pump 50 is set. In detecting a final vacuum, this is accomplished by setting a pumping stroke, for example, in an adjustable axial piston pump, by adjusting the maximum piston stroke length to zero, so that vacuum pump 50 provides no more pumping capacity and only friction losses in vacuum pump 50 are to be overcome. In the case of low-speed stop-and-go driving in purely electric operation of the vehicle, another independent vacuum pump 74 may be provided if necessary, since an excessively low pump speed of vacuum pump 50 coupled to rotor 36 of the at least one electric drive 16 limits the maximum possible volume flow of vacuum pump 50 to an excessively low value. Additional vacuum pump 74, which may be optionally provided, is preferably a vacuum pump driven by an electric drive 76 and may be designed for a lower volume flow and a shorter service life compared to a single pump.

The vacuum level prevailing in vacuum accumulator 70 may be monitored, for example, by sensors. This monitoring by sensors may be used, for example, for activating the at least one electric drive 16 via driving functions in special driving situations of the vehicle equipped with hybrid drive 10. Thus, while the vehicle is at a standstill, the at least one electric drive 16 may be operated in an uncoupled manner by disengaging A clutch 14, whereby vacuum pump 50 mechanically connected thereto is driven, ensuring the vacuum supply to the brake system. In addition to the driving situation "vehicle at a standstill," the vacuum supply to the brake system may be ensured in the driving situation "pure electric driving" with the aid of vacuum pump 50, which is mechanically coupled to rotor 36 of the at least one electric drive 16. In contrast to internal combustion engine 12 which is uncoupled due to the disengaged A clutch 14, in purely electric driving operation, the at least one electric drive 16 is capable of outputting mechanical power to auxiliary devices, which include vacuum pump 50. Vacuum-controlled actuator 62 activates vacuum pump 50, ensuring that no operation of vacuum pump 50 permanently consuming mechanical energy occurs when a sufficient vacuum exists in vacuum accumulator 70. Vacuum pump 50 rotating as a function of the rotational speed of electric drive 16 now pumps air from vacuum accumulator 70 into the environment when the vacuum drops in the vacuum accumulator. Pressure-controlled actuator 62 is preferably designed as a vacuum actuator which is pneumatically activated by the vacuum applied in vacuum line 52. If a final vacuum is attained in vacuum accumulator 70, the piston stroke of an adjustable axial piston pump may be set to zero, so that vacuum pump 50 provides no more pumping capacity and only friction losses in vacuum pump 50 are to be overcome. In the case of a driving situation "stop-and-go drive at low speed" in the operating mode "purely electric driving operation" of the vehicle having a hybrid drive 10 lasting for a longer time period, an independent electrically driven vacuum pump, e.g., additional vacuum pump 74, may optionally be used, which efficiently ensures a basic vacuum supply. Additional vacuum pump 74 is designed for a lower volume flow and a shorter service life, since it is used only in certain driving situations of the vehicle equipped with the hybrid drive 10.

What is claimed is:

1. A method for generating a vacuum for a brake system of a vehicle equipped with a hybrid drive, the hybrid drive including an internal combustion engine and at least one electric drive selectively uncoupled from the internal combustion engine with aid of a clutch located between the internal combustion engine and the at least one electric drive, the hybrid drive being operable in a pure electric driving mode, the method comprising:
   when the clutch is disengaged during the pure electric driving mode, using the at least one electric drive to drive a vacuum pump having an adjustable pumping capacity;
   activating the vacuum pump using a vacuum-controlled actuator, as a function of a vacuum prevailing in a vacuum accumulator; and
   using a vacuum line running between the vacuum accumulator and the vacuum pump both as a supply line between the vacuum accumulator and the vacuum pump, and as a control line for the vacuum-controlled actuator.

2. A device for generating a vacuum for a brake system of a vehicle equipped with a hybrid drive, the hybrid drive comprising an internal combustion engine and at least one electric drive which is selectively uncoupled from the internal combustion engine with aid of a clutch, the device comprising:
   a vacuum pump including one of an adjustable pumping capacity and a switchable clutch, and configured to be mechanically coupled to the at least one electric drive; and
   an additional, electrically operated vacuum pump associated with the vacuum pump, the additional vacuum pump being operated to ensure an adequate vacuum supply to the brake system during low-speed driving phases of the vehicle;
   wherein the hybrid drive is operable in a pure electric driving mode.

3. The device for generating a vacuum as recited in claim 2, further comprising:
   a vacuum-controlled actuator associated with the vacuum pump, the vacuum-controlled actuator activating the vacuum pump as a function of a vacuum prevailing in a vacuum accumulator.

4. The device for generating a vacuum as recited in claim 2, further comprising:

a mechanical link between the vacuum pump and the at least one electric drive, the mechanical link being implemented using one of a toothed gear which meshes with a pinion, a spur gear link, an angle drive, a belt drive and a chain drive.

5. The device for generating a vacuum as recited in claim 3, further comprising:
a vacuum line running between the vacuum accumulator and the vacuum pump.

6. The device for generating a vacuum as recited in claim 3, wherein the vacuum-controlled actuator is one of a vacuum actuator and an electronic system.

7. A device for generating a vacuum for a brake system of a vehicle equipped with a hybrid drive, the hybrid drive comprising an internal combustion engine and at least one electric drive which is selectively uncoupled from the internal combustion engine with aid of a clutch, the device comprising:
a vacuum pump including one of an adjustable pumping capacity and a switchable clutch, and configured to be mechanically coupled to the at least one electric drive;
a vacuum-controlled actuator associated with the vacuum pump and activating the vacuum pump as a function of a vacuum prevailing in a vacuum accumulator; and
a vacuum line running between the vacuum accumulator and the vacuum pump;
wherein:
the hybrid drive is operable in a pure electric driving mode; and
the vacuum line is used both as a supply line between the vacuum accumulator and the vacuum pump, and as a control line for the vacuum-controlled actuator.

8. The device for generating a vacuum as recited in claim 7, wherein the vacuum-controlled actuator is one of a vacuum actuator and an electronic system.

9. The device for generating a vacuum as recited in claim 7, further comprising:
a mechanical link between the vacuum pump and the at least one electric drive, the mechanical link being implemented using one of a toothed gear which meshes with a pinion, a spur gear link, an angle drive, a belt drive and a chain drive.

10. The device for generating a vacuum as recited in claim 7, wherein the vacuum-controlled actuator is configured to operate the vacuum pump to pump air from the vacuum accumulator only while the vacuum drops in the vacuum accumulator.

11. The device for generating a vacuum as recited in claim 7, wherein the vacuum-controlled actuator is configured to operate the vacuum pump to pump air from the vacuum accumulator into the environment only while the vacuum drops in the vacuum accumulator.

12. The device for generating a vacuum as recited in claim 7, wherein the device is configured for the vacuum pump to be operated to pump air from the vacuum accumulator only while the vacuum drops in the vacuum accumulator.

13. The device for generating a vacuum as recited in claim 7, wherein the device is configured for the vacuum pump to be operated to pump air from the vacuum accumulator into the environment only while the vacuum drops in the vacuum accumulator.

14. A method for generating a vacuum for a brake system of a vehicle equipped with a hybrid drive, the hybrid drive including an internal combustion engine and at least one electric drive selectively uncoupled from the internal combustion engine with aid of a clutch located between the internal combustion engine and the at least one electric drive, the hybrid drive being operable in a pure electric driving mode, the method comprising:
when the clutch is disengaged during the pure electric driving mode, using the at least one electric drive to drive a vacuum pump having an adjustable pumping capacity;
activating the vacuum pump using a vacuum-controlled actuator, as a function of a vacuum prevailing in a vacuum accumulator; and
operating an additional, electrically operated vacuum pump to ensure an adequate vacuum supply at low rotational speeds of the at least one electric drive.

15. The method as recited in claim 14, further comprising:
when a final vacuum is attained in the vacuum accumulator, setting a pumping capacity of the vacuum pump to zero using the vacuum-controlled actuator.

16. The method as recited in claim 14, further comprising:
operating the vacuum pump to pump air from the vacuum accumulator into the environment only when the vacuum drops in the vacuum accumulator.

17. The method as recited in claim 14, further comprising:
during a vehicle standstill, operating the at least one electric drive, which is uncoupled from the internal combustion engine, to drive the vacuum pump.

* * * * *

UNITED STATES PATENT AND TRADEMARK OFFICE
CERTIFICATE OF CORRECTION

PATENT NO. : 8,528,674 B2  Page 1 of 1
APPLICATION NO. : 12/305805
DATED : September 10, 2013
INVENTOR(S) : Kraft et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1244 days.

Signed and Sealed this
Fifteenth Day of September, 2015

Michelle K. Lee
*Director of the United States Patent and Trademark Office*